(12) United States Patent
Neuvirth et al.

(10) Patent No.: US 12,289,321 B2
(45) Date of Patent: Apr. 29, 2025

(54) AUTOMATED GENERATION AND DEPLOYMENT OF HONEY TOKENS IN PROVISIONED RESOURCES ON A REMOTE COMPUTER RESOURCE PLATFORM

(71) Applicant: Microsoft Technology Licensing, LLC, Redmond, WA (US)

(72) Inventors: Hani Hana Neuvirth, Redmond, WA (US); Tomer Weinberger, Tel Aviv (IL); Yaniv Zohar, Herzliya (IL); Craig A. Nelson, Redmond, WA (US); Andrew E. Johnson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 812 days.

(21) Appl. No.: 16/291,963

(22) Filed: Mar. 4, 2019

(65) Prior Publication Data

US 2020/0287915 A1    Sep. 10, 2020

(51) Int. Cl.
*H04L 9/40* (2022.01)
(52) U.S. Cl.
CPC ...... *H04L 63/1416* (2013.01); *H04L 63/0853* (2013.01); *H04L 63/10* (2013.01); *H04L 63/1491* (2013.01)
(58) Field of Classification Search
CPC . H04L 63/1416; H04L 63/0853; H04L 63/10; H04L 63/1491
See application file for complete search history.

(56) References Cited

U.S. PATENT DOCUMENTS 6,185,683 B1 * 2/2001 Ginter ............... G07F 9/026
    705/52
7,587,611 B2 * 9/2009 Johnson ............ H04L 63/102
    726/36

(Continued)

FOREIGN PATENT DOCUMENTS

WO    WO-2014160479 A1 * 10/2014    ......... H04L 63/08
WO    WO-2017013589 A1 *  1/2017    ......... H04L 63/1425

OTHER PUBLICATIONS

El-Kosairy et al "A New Web Deception System Framework," pp. 1-10, IEEE (Year: 2018).*

(Continued)

*Primary Examiner* — Luu T Pham
*Assistant Examiner* — James J Wilcox
(74) *Attorney, Agent, or Firm* — Newport IP, LLC; Jacob P. Rohwer

(57) ABSTRACT

Methods, systems, and media are shown for creating and deploying honey tokens for intrusion detection in a remote computing resource system. Resource modules provisioned for a tenant are identified for intrusion detection. For each identified resource modules, a provisioned resource having a corresponding access credential is allocated and the access credential is deployed in the identified resource module. A data entry is created in a token mapping store that identifies the access credential and the resource module. Access logs are scanned to detect access attempts. For each access attempt, the token mapping store is searched for a data entry with an access credential that matches the access credential of the access attempt. If found, an alert is generated that includes the identified resource module of the matching data entry.

17 Claims, 11 Drawing Sheets

(56) References Cited

U.S. PATENT DOCUMENTS

| | | | | |
|---|---|---|---|---|
| 7,788,700 | B1* | 8/2010 | Feezel | H04L 63/1416 713/168 |
| 7,813,759 | B2* | 10/2010 | Virgile | H04W 88/18 455/552.1 |
| 8,479,266 | B1* | 7/2013 | Delker | H04L 63/0272 726/4 |
| 8,554,912 | B1* | 10/2013 | Reeves | G06F 21/552 455/410 |
| 8,590,004 | B2* | 11/2013 | Comay | H04L 63/20 726/4 |
| 8,683,560 | B1* | 3/2014 | Brooker | H04L 63/20 713/168 |
| 8,793,758 | B2* | 7/2014 | Raleigh | H04L 41/046 455/414.1 |
| 8,875,229 | B2* | 10/2014 | Hoyos | H04W 12/08 726/28 |
| 8,880,435 | B1* | 11/2014 | Catlett | G06Q 20/10 705/75 |
| 8,914,406 | B1* | 12/2014 | Haugsnes | G06F 9/45558 710/316 |
| 8,966,276 | B2* | 2/2015 | Nanopoulos | H04L 63/0853 726/8 |
| 9,021,578 | B1* | 4/2015 | Casaburi | H04L 63/1416 726/15 |
| 9,129,086 | B2* | 9/2015 | Betz | H04L 9/32 |
| 9,177,156 | B1* | 11/2015 | Kaplan | G06Q 10/06398 |
| 9,202,049 | B1* | 12/2015 | Book | G06F 21/562 |
| 9,219,744 | B2* | 12/2015 | Baliga | G06F 21/566 |
| 9,299,053 | B2* | 3/2016 | Gazdzinski | G06Q 20/204 |
| 9,398,010 | B1* | 7/2016 | Chickering | H04L 63/0876 |
| 9,401,925 | B1* | 7/2016 | Guo | G06F 21/552 |
| 9,419,942 | B1* | 8/2016 | Buruganahalli | H04L 63/06 |
| 9,424,413 | B2* | 8/2016 | Hammad | H04L 63/0428 |
| 9,547,998 | B2* | 1/2017 | Sadeh-Koniecpol | G06F 21/566 |
| 9,705,919 | B1* | 7/2017 | Jacobsen | H04L 63/102 |
| 9,742,805 | B2* | 8/2017 | Touboul | G06F 21/554 |
| 9,763,086 | B2* | 9/2017 | Benoit | G07C 9/00857 |
| 9,836,512 | B1* | 12/2017 | Singh | G06F 21/566 |
| 9,838,416 | B1* | 12/2017 | Aziz | G06F 21/568 |
| 9,894,099 | B1* | 2/2018 | Jacobsen | H04L 63/14 |
| 9,900,330 | B1* | 2/2018 | Dargude | H04L 63/20 |
| 9,973,517 | B2* | 5/2018 | Hsiao | G06F 21/554 |
| 10,028,147 | B1* | 7/2018 | Coney | H04W 4/021 |
| 10,075,384 | B2* | 9/2018 | Shear | H04L 47/83 |
| 10,079,842 | B1* | 9/2018 | Brandwine | H04L 63/1441 |
| 10,178,122 | B1* | 1/2019 | Shavell | H04L 63/1441 |
| 10,182,062 | B2* | 1/2019 | Aabye | G06F 21/14 |
| 10,305,920 | B2* | 5/2019 | Balasubramanian | H04L 63/1433 |
| 10,320,784 | B1* | 6/2019 | Talmor | H04L 63/1425 |
| 10,320,789 | B1* | 6/2019 | Tribbensee | G06F 21/6245 |
| 10,348,767 | B1* | 7/2019 | Lee | H04L 63/0236 |
| 10,412,097 | B1* | 9/2019 | Banshats | H04L 63/083 |
| 10,454,971 | B2* | 10/2019 | Chalmers | H04L 63/105 |
| 10,484,331 | B1* | 11/2019 | Rossman | H04L 63/0209 |
| 10,530,578 | B2* | 1/2020 | Keshava | G06F 12/1466 |
| 10,541,992 | B2* | 1/2020 | Kong | H04L 41/046 |
| 10,558,797 | B2* | 2/2020 | Wright | G06F 21/45 |
| 10,574,698 | B1* | 2/2020 | Sharifi Mehr | H04L 63/1491 |
| 10,601,805 | B2* | 3/2020 | Lerner | G06F 21/36 |
| 10,642,988 | B2* | 5/2020 | Quintanilla | H04L 9/3263 |
| 10,652,276 | B1* | 5/2020 | Rambo | H04L 63/1433 |
| 10,701,094 | B2* | 6/2020 | Kirti | H04L 63/104 |
| 10,728,262 | B1* | 7/2020 | Vaswani | G06F 21/62 |
| 10,826,905 | B2* | 11/2020 | Gujarathi | H04L 67/567 |
| 10,904,277 | B1* | 1/2021 | Sharifi Mehr | H04L 63/1425 |
| 10,924,481 | B2* | 2/2021 | Haletky | H04W 12/06 |
| 11,044,240 | B2* | 6/2021 | Dowlatkhah | H04L 63/08 |
| 2004/0068668 | A1* | 4/2004 | Lor | H04L 69/329 709/224 |
| 2004/0088551 | A1* | 5/2004 | Dor | H04L 63/0853 713/182 |
| 2004/0107219 | A1* | 6/2004 | Rosenberger | H04L 43/00 |
| 2005/0071283 | A1* | 3/2005 | Randle | G06Q 20/12 705/75 |
| 2005/0182950 | A1* | 8/2005 | Son | H04L 63/1416 713/189 |
| 2005/0198534 | A1* | 9/2005 | Matta | H04W 12/06 726/5 |
| 2005/0222933 | A1* | 10/2005 | Wesby | H04W 4/06 705/36 R |
| 2005/0235352 | A1* | 10/2005 | Staats | H04L 41/082 726/5 |
| 2005/0260973 | A1* | 11/2005 | van de Groenendaal | H04M 1/67 455/411 |
| 2006/0140134 | A1* | 6/2006 | O'Brien | H04L 63/0428 370/252 |
| 2007/0156897 | A1* | 7/2007 | Lim | G06Q 10/10 709/225 |
| 2008/0057913 | A1* | 3/2008 | Sinha | H04W 12/122 455/414.1 |
| 2008/0271122 | A1* | 10/2008 | Nolan | G06F 21/34 726/4 |
| 2009/0158032 | A1* | 6/2009 | Costa | H04L 63/0823 380/270 |
| 2009/0199296 | A1* | 8/2009 | Xie | G06F 21/316 726/23 |
| 2009/0239468 | A1* | 9/2009 | He | H04W 12/069 726/19 |
| 2011/0055928 | A1* | 3/2011 | Brindza | H04W 12/08 726/26 |
| 2012/0116602 | A1* | 5/2012 | Vaswani | H04L 9/0897 700/295 |
| 2012/0144201 | A1* | 6/2012 | Anantha | H04L 9/3247 713/172 |
| 2012/0159579 | A1* | 6/2012 | Pineau | H04L 63/101 726/4 |
| 2012/0331545 | A1* | 12/2012 | Baliga | H04L 63/0272 726/15 |
| 2013/0133072 | A1* | 5/2013 | Kraitsman | H04L 63/1433 726/23 |
| 2013/0173913 | A1* | 7/2013 | Kocsis | H04W 12/069 713/156 |
| 2013/0179991 | A1* | 7/2013 | White | G06F 21/53 726/29 |
| 2014/0006347 | A1* | 1/2014 | Qureshi | H04W 12/06 707/783 |
| 2014/0020072 | A1* | 1/2014 | Thomas | H04L 67/10 726/7 |
| 2014/0248854 | A1* | 9/2014 | Schell | H04L 63/0853 455/411 |
| 2014/0366118 | A1* | 12/2014 | Yin | G06F 11/1471 726/12 |
| 2015/0013006 | A1* | 1/2015 | Shulman | H04L 63/0263 726/23 |
| 2015/0135266 | A1* | 5/2015 | Shulman | H04L 63/0263 726/1 |
| 2015/0172305 | A1* | 6/2015 | Dixon | G06F 21/53 726/23 |
| 2015/0180829 | A1* | 6/2015 | Yu | H04L 63/083 726/11 |
| 2015/0212843 | A1* | 7/2015 | Turgeman | G06F 21/32 718/1 |
| 2015/0256528 | A1* | 9/2015 | Turgeman | H04L 67/535 726/28 |
| 2015/0271162 | A1* | 9/2015 | Dulkin | H04L 63/1408 726/7 |
| 2015/0326608 | A1* | 11/2015 | Shabtai | H04L 63/1425 726/23 |
| 2016/0050205 | A1* | 2/2016 | Heller | H04L 63/10 726/4 |
| 2016/0080379 | A1* | 3/2016 | Saboori | H04L 63/0876 726/5 |
| 2016/0125139 | A1* | 5/2016 | Higgs | H04L 63/083 705/3 |
| 2016/0255117 | A1* | 9/2016 | Sinha | G06F 21/56 726/1 |

(56) References Cited

U.S. PATENT DOCUMENTS

| | | | |
|---|---|---|---|
| 2016/0277374 A1* | 9/2016 | Reid | H04L 63/0435 |
| 2016/0301712 A1* | 10/2016 | Shulman | H04L 63/0263 |
| 2016/0330230 A1* | 11/2016 | Reddy | H04L 63/166 |
| 2016/0381023 A1* | 12/2016 | Dulce | H04L 63/1491 726/9 |
| 2017/0134405 A1* | 5/2017 | Ahmadzadeh | H04L 63/1433 |
| 2017/0134423 A1* | 5/2017 | Sysman | G06F 21/554 |
| 2017/0163664 A1* | 6/2017 | Nagalla | H04L 63/1441 |
| 2017/0185773 A1* | 6/2017 | Lemay | H04L 63/145 |
| 2017/0195346 A1* | 7/2017 | Be'ery | H04L 63/083 |
| 2017/0214701 A1* | 7/2017 | Hasan | H04L 63/1433 |
| 2017/0235955 A1* | 8/2017 | Barkan | H04L 63/0853 726/11 |
| 2017/0237749 A1* | 8/2017 | Wood | H04L 63/145 726/23 |
| 2017/0244672 A1* | 8/2017 | Shulman | H04L 12/4633 |
| 2017/0244729 A1* | 8/2017 | Fahrny | G06F 21/552 |
| 2017/0324773 A1* | 11/2017 | Ohayon | H04L 63/10 |
| 2017/0324774 A1* | 11/2017 | Ohayon | G06F 21/554 |
| 2017/0339186 A1* | 11/2017 | Gurvich | H04L 67/1097 |
| 2017/0346804 A1* | 11/2017 | Beecham | H04L 63/08 |
| 2017/0346851 A1* | 11/2017 | Drake | H04L 9/0838 |
| 2018/0063143 A1* | 3/2018 | Wilson | H04L 63/10 |
| 2018/0101675 A1* | 4/2018 | Kubler | G06F 21/42 |
| 2018/0198786 A1* | 7/2018 | Shah | H04W 12/069 |
| 2018/0227128 A1* | 8/2018 | Church | H04L 9/3247 |
| 2018/0343283 A1* | 11/2018 | Goutal | H04L 63/06 |
| 2019/0044950 A1* | 2/2019 | Chen | H04L 67/02 |
| 2019/0095516 A1* | 3/2019 | Srinivasan | H04L 63/102 |
| 2019/0124112 A1* | 4/2019 | Thomas | G06F 21/44 |
| 2019/0132299 A1* | 5/2019 | Tucker | H04L 63/0853 |
| 2019/0207771 A1* | 7/2019 | Hecht | H04L 63/1408 |
| 2019/0207956 A1* | 7/2019 | Be'ery | H04L 63/0428 |
| 2019/0306138 A1* | 10/2019 | Carru | H04L 9/3247 |
| 2019/0349766 A1* | 11/2019 | Rhelimi | H04L 67/01 |
| 2020/0021581 A1* | 1/2020 | Wu | G06F 21/32 |
| 2020/0057850 A1* | 2/2020 | Kraus | H04L 63/14 |
| 2020/0076849 A1* | 3/2020 | Watson | H04W 12/128 |
| 2020/0137026 A1* | 4/2020 | Shulman | H04L 63/1491 |
| 2020/0153836 A1* | 5/2020 | Johnson | H04L 63/1491 |
| 2020/0264860 A1* | 8/2020 | Srinivasan | G06F 16/27 |
| 2020/0267184 A1* | 8/2020 | Vera-Schockner | H04L 9/3263 |
| 2020/0287915 A1* | 9/2020 | Neuvirth | H04L 63/0853 |

OTHER PUBLICATIONS

Jogdand et al "Survey of Different IDS Using Honeytoken based Techniques to Mitigate Cyber Threats," International Conference on Electrical, Electronics and Optimization Techniques (ICEEOT), pp. 802-807 (Year: 2016).*

Amara et al "Cloud Computing Security Threats and Attacks with their Mitigation Techniques," 2017 International Conference on Cyber-Enabled Distributed Computing and Knowledge Discovery, pp. 244-251 (Year: 2017).*

Mahajan et al "Deployment of Intrusion Detection in Cloud: A Performance-Based Study," 2017 IEEE Trustcom/Big Data/ICESS, IEEE Computer Society, pp. 1103-1108.*

Bercovitch et al "HoneyGen: An Automated Honeytokens Generator," IEEE, pp. 131-136 (Year: 2011).*

Fraunholz et al On the Detection and Handling of Security Incidents and Perimeter Breaches—A Modular and Flexible Honeytoken based Framework, IEEE, pp. 1-4 (Year: 2018).*

Bourke, et al., "Breach Detection at Scale with AWS Honey Tokens", Retrieved From: https://web.archive.org/web/20180828210840/https://www.blackhat.com/docs/asia-18/asia-18-bourke-grzelak-breach-detection-at-scale-with-aws-honey-tokens-wp.pdf, Aug. 28, 2018, 2 Pages.

Sheridan, Kelly, "Hunting Cybercriminals with AWS Honey Tokens", Retrieved From: https://www.darkreading.com/cloud/hunting-cybercriminals-with-aws-honey-tokens/d/d-id/1331342, Mar. 22, 2018, 7 Pages.

Bercovitch, et al., "HoneyGen: An Automated Honeytokens Generator", In Proceedings of the IEEE International Conference on Intelligence and Security Informatics, Jul. 10, 2011, pp. 131-136.

Jay, et al., "Rethinking Security in the Era of Cloud Computing", In Journal of IEEE Security and Privacy, vol. 15, Issue 3, Jun. 16, 2017, pp. 60-69.

"International Search Report and Written Opinion Issued in PCT Application No. PCT/US20/015515", Mailed Date: Jul. 27, 2020, 12 Pages.

Communication pursuant to Article 94(3) Received in European Patent Application No. 20732339.5, mailed on Oct. 16, 2024, 5 pages.

* cited by examiner

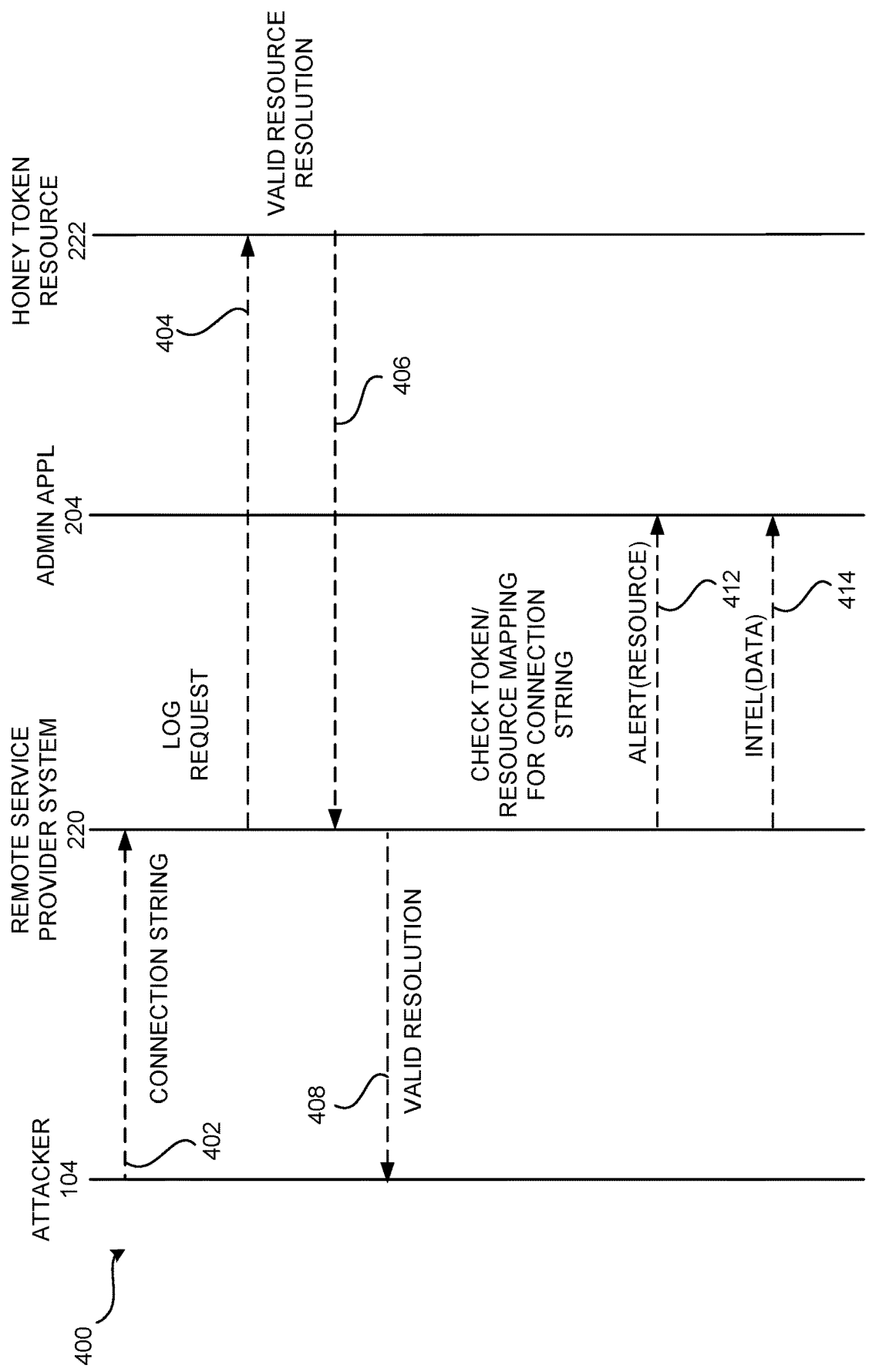

AUTOMATED GENERATION AND DEPLOYMENT OF HONEY TOKENS IN PROVISIONED RESOURCES ON A REMOTE COMPUTER RESOURCE PLATFORM

BACKGROUND

In remote computing resource systems, e.g. cloud services platforms, generally provide Platform as a Service (PaaS) resources to subscriber users. For example, a tenant user subscriber is provisioned with resources on one or more servers of a remote computing resource system to store and access data, host websites, host services (e.g. email or communication services), or support user applications (e.g. word processing or database applications). Generally, users in the tenant user's domain are able to access the resources provisioned for the tenant user on the remote computing resource system through a wide area communication network, such as the internet.

However, the broad accessibility of the remote computing resource system often leads to attacks by malicious entities that attempt to access the tenant user's resources. The attack methods used by malicious entities vary widely and are generally expanding. A variety of security detection approaches are utilized to detect the activity of these malicious entities. Many of these security approaches are passive, i.e. they scan system logs to detect anomalous or noisy activity directed at tenant user resources using known attack methods of malicious entities.

In contrast, honey tokens provide an active approach in which traps are set for a malicious entity, e.g. an external user, that is unfamiliar with the system. Conventionally, honey tokens are fictitious secrets or resources (e.g. keys, users, records or other resources) that are not in use in the regular operation of a tenant user domain on a remote computing resource system so that legitimate users are unlikely to attempt to access the honey tokens. They are added to the tenant user domain and then monitored for access. Hence, access to honeytokens can indicate malicious activity in the protected system.

The honey tokens are monitored to track abuse of resources. For example, when an attempt to access a honey token is detected, an alert it generated, which notifies the administrator of the tenant user domain or an administrator of the remote computing resource system or an administrator of the tenant user domain. These alerts are generally effective in detecting malicious activity so that an administrator can take further action to preserve the security of the tenant user domain.

Typically, in current solutions, an administrator of the tenant user domain manually creates the honey tokens and deploys them in the tenant user domain, which is often based on monitoring system logs, such as system logs for remote resource systems, e.g. cloud resource platforms. Managing, deploying and monitoring the honey tokens can be a complicated and onerous task, which may discourage or limit administrators from utilizing honey tokens. Also, if an attacker recognizes that a honey token involves a fictitious resource, the attacker may become aware that their activity has been detected and avoid further access attempts, which limits the amount of threat intelligence that can be obtained regarding the attacker's methods.

It is with respect to these and other technical challenges that the disclosure made herein is presented.

SUMMARY

The disclosed technology generally shows methods, media and systems for automatically generating and deploying honey tokens in order to protect tenant subscriber resources, e.g. a cloud subscription, in remote computing resource systems, e.g. cloud platforms.

The disclosed technology provides for intrusion detection in a remote computing resource system involving identifying one or more tenant resource modules for intrusion detection, where the tenant resource modules are provisioned for a tenant of a remote service provider system. For each of the one or more identified resource modules, the disclosed technology calls for allocating a storage account having a corresponding access credential, deploying the corresponding access credential in the identified resource module, and creating a data entry in a token mapping store, where the data entry identifies the tenant, the access credential, and the identified resource module.

For intrusion detection, the disclosed technology involves scanning one or more access logs for the remote computing resource system to detect one or more resource access attempts, each access attempt including an access credential for the access attempt. For each resource access attempt, the disclosed technology involves searching the token mapping store for a matching data entry where the access credential of the data entry matches the access credential for the access attempt, and, if the matching data entry is found, generating an alert that includes the identified resource module of the matching data entry.

In some examples of particular aspects of the disclosed technology, the provisioned resource can be an unused resource allocated for the tenant. In some examples, the unused resource allocated for the tenant can be a container with restricted access permissions. In other examples, the provisioned resource comprises a resource provisioned in the remote computing resource system. In other specific examples, the tenant resource modules provisioned for a tenant of a remote service provider system can be a key vault, a data store, a virtual machine, an application service, an application programming interface, a communications store, a domain directory, or a credential data store.

Another example in accordance with certain aspects of the disclosed technology provides for detecting intrusion in a remote computing resource system by identifying one or more resource modules for intrusion detection, where the resource modules are provisioned for a tenant of a remote service provider system. For each of the identified resource modules, the disclosed technology calls for allocating a provisioned resource having a corresponding access credential, deploying the corresponding access credential in the identified resource module, and creating a data entry in a token mapping store, where the data entry identifies the tenant, the access credential, and the identified resource module.

In particular examples in accordance with the disclosed technology, the corresponding access credential for the provisioned resource can be a connection string, an access key, a certificate, a service key, a management key, a storage key, or an access token.

As discussed briefly above, implementations of the technologies disclosed herein enable honey tokens to be automatically generated and deployed to detect malicious attempts to access resources for a tenant user domain residing on a remote resource service provider platform. The improved detection of malicious activity provided by the disclosed technology can enable an administrator to undertake greater security countermeasures to prevent resources from being compromised or corrupted.

In addition, certain aspects of the disclosed technology can collect improved threat intelligence data, such as Indicators of Compromise (IoC) that can also be useful to an administrator to develop or deploy more effective security countermeasures. Further, in accordance with certain other aspects of the disclosed technology relating to utilizing provisioned resources for honey tokens can reduce a probability that an attacker will recognize that their activity has been detected and permit additional threat intelligence to be obtained from continued activity by the attacker.

Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a messaging diagram illustrating an example of message and data exchange when an intrusion is detected in accordance with the disclosed technology;

DETAILED DESCRIPTION

Figure 1A:
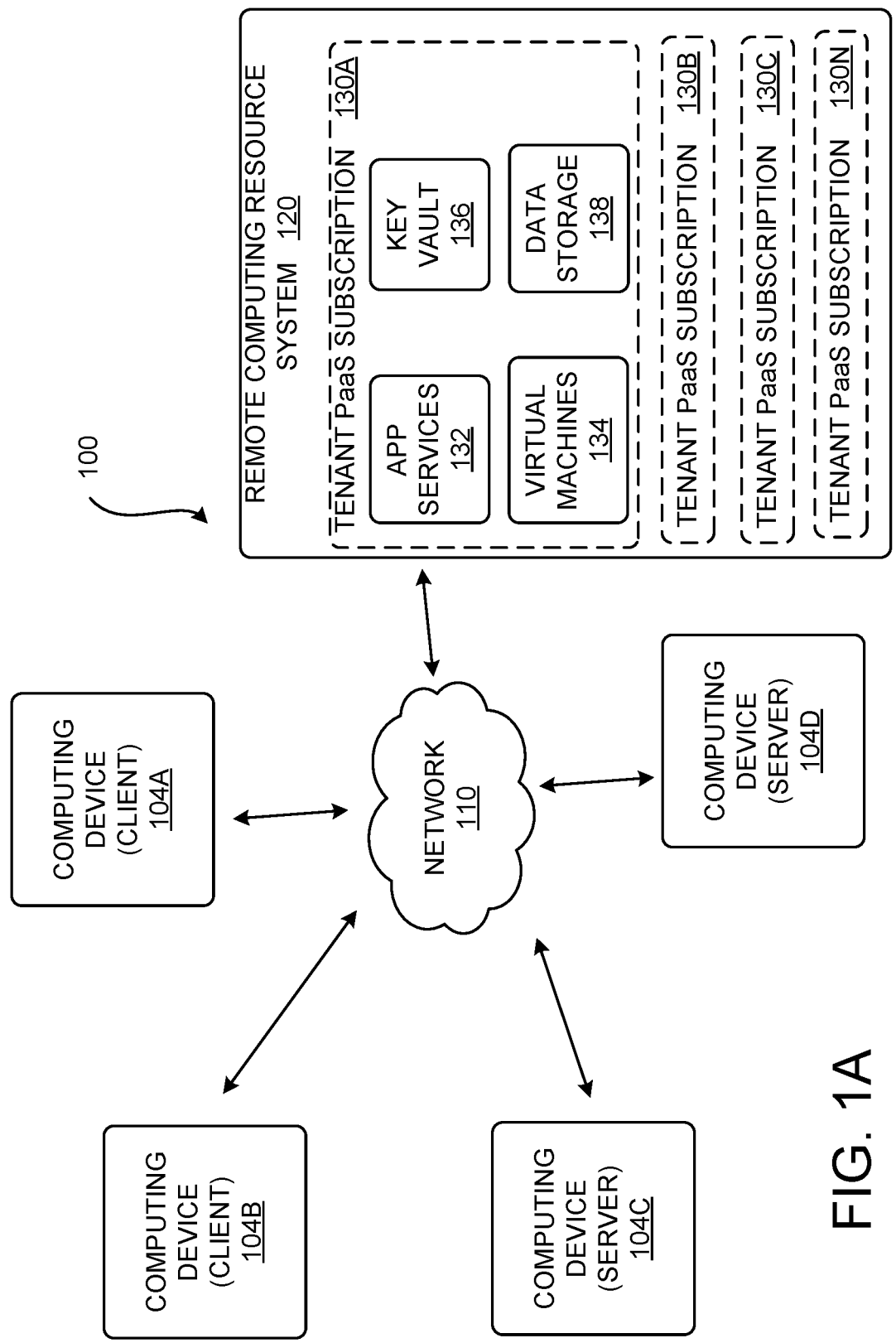
FIG. 1A is a network architecture diagram showing an illustrative computing system involving tenant user domains hosted on a remote computing resource system.

The following detailed description is directed to an approach for automatically generating and deploying honey tokens in order to protect tenant subscriber resources in remote computing resource systems. As discussed briefly above, the use of honey tokens, e.g. monitored resources that may attract the interesting of a malicious entity who has penetrated a system, is advantageous to an administrator of the system to detect when the system has been compromised.

However, creating, deploying and managing honey tokens in a complex system can be a complicated and challenging task for administrators, which may discourage administrators from making widespread use of honey tokens for intrusion detection. Also, the honey tokens in many conventional uses are typically fictitious entities that, when recognized by the attacker, can alert the attacker that they have been detected causing the attacker to terminate their attack, which limits the threat intelligence that can be obtained from observing the attacker's activities.

In general terms, implementations of the disclosed technology can enable the automatic generation and deployment of honey tokens that utilize provisioned resources. Resource modules, such as resources provisioned for a tenant subscriber in a remote computer resources system, can be identified for intrusion detection. For each resource identified for intrusion detection, a provisioned resource is allocated as a honey token and an access credential corresponding to the allocated resource is deployed in the resource. A data entry is created in a token mapping store that maps the access credential to the resource module in which it is deployed.

Subsequently, access logs are scanned for access attempts that match an entry in the token mapping store, i.e. the access credential of the access attempt matches the access credential of a data entry in the token mapping store. If a matching entry is found, then an intrusion in the resource module has been detected. An alert can be generated to notify an administrator that the resource module in the matching data entry has been compromised.

Alternatively or in addition, indications of compromise data regarding the intrusion, such as data regarding characteristics of the attacker or the attacker's methods along with the resource module, can be included in a threat intelligence feed. Because a provisioned resource, such as an unused tenant resource or a resource provisioned for the remote computer resources system, is utilized as the honey token, an attacker's attempt to access the honey token will successfully resolve to the provisioned resource, which may prevent the attacker from recognizing that they have been detected so their continuing activities can be monitored and analyzed.

The disclosed technology improves computer security by automatically generating and deploying honey tokens to resource modules, where the honey tokens represent provisioned resources.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several figures, aspects of automatic generation and deployment of honey tokens in a remote system resources platform will be described.

The remote computing resource system discussed herein typically provides a PaaS for a tenant user, e.g. the "cloud," by provisioning remote computer resources to perform computer processing, such as to respond to user control inputs or other data input. In some cloud computing scenarios, some operations may be implemented in one set of computing resources, such as clients and servers, and other operations may be implemented in other computing resources, such as cloud resources provided by one or more compute resource providers. A cloud computing environment may include many computer resource provider systems offered by different providers. Examples of compute resource providers include the WINDOWS AZURE Service Platform from MICROSOFT CORPORATION, the AMAZON AWS from AMAZON, INC., the GOOGLE Cloud Platform from GOOGLE INC., and platform virtualization software and services from VMWARE, INC.

FIG. 1A is a network architecture diagram showing an illustrative remote computing environment 100 involving user or server computing devices 104 in combination with a remote computing resource system 120. In this example, computing devices 104A and 104B are client devices, such as personal computers, laptop computers, tablet computers, or smart phones, and computing devices 104C and 104D are servers, such as servers operated and maintained by an entity on their own premises. The client devices 104A and 104B and server devices 104C and 104D, in this example, are in communication with the resources of remote email service provider system 120 through network 110.

In the example of FIG. 1A, remote computing resource system 120 is configured to provide application services to users of computing devices 104, such as email messaging, text messaging, remote applications, remote storage, etc., through network 110. For example, a user with a user account in a subscribed tenant user domain can login to remote computing resource system 120 through network 110 in order to utilize an email service.

Remote computing resource system 120, in this example, supports one or more tenant users who subscribe to the system 120 and are each provisioned with a tenant user PaaS subscription environment 130. Based on the nature of each subscription, the remote computing resource system 120 can provision resource modules to provide a platform for each tenant user to support users in the tenant's domain. For example, application services 132 can be provisioned in the tenant user's domain to support user applications, such as email, word processing or browser applications. In addition, remote computing resource system 120 can provision virtual machines 134 for running tenant user processes, a key vault 136, for storing tenant user secrets, and data storage 138, for storing tenant user data.

An attacker can also utilize a computing device 104 to attempt to login to or access the resources of remote computing resource system 120 through network 110. For example, in a brute force attack technique, an attacker will repeatedly try to login to the remote computing resource system with a variety of user names or account identifiers and passwords with the intent of finding a set of credentials, e.g. user name and password combination, that allows them to access an account. Automated techniques have been developed by attackers to generate and attempt login with large numbers of user name and password combinations.

An attacker will typically use remote access tools to access many different resources and data of the tenant user domains supported by the remote computing resource system 120. For instance, the attacker may attempt to access data in domain controllers to discover accounts and obtain access to resources and files for the accounts. An attacker may also search for credentials and secrets for the tenant user domain that are stored on remote computing resource system 120.

Figure 1B:
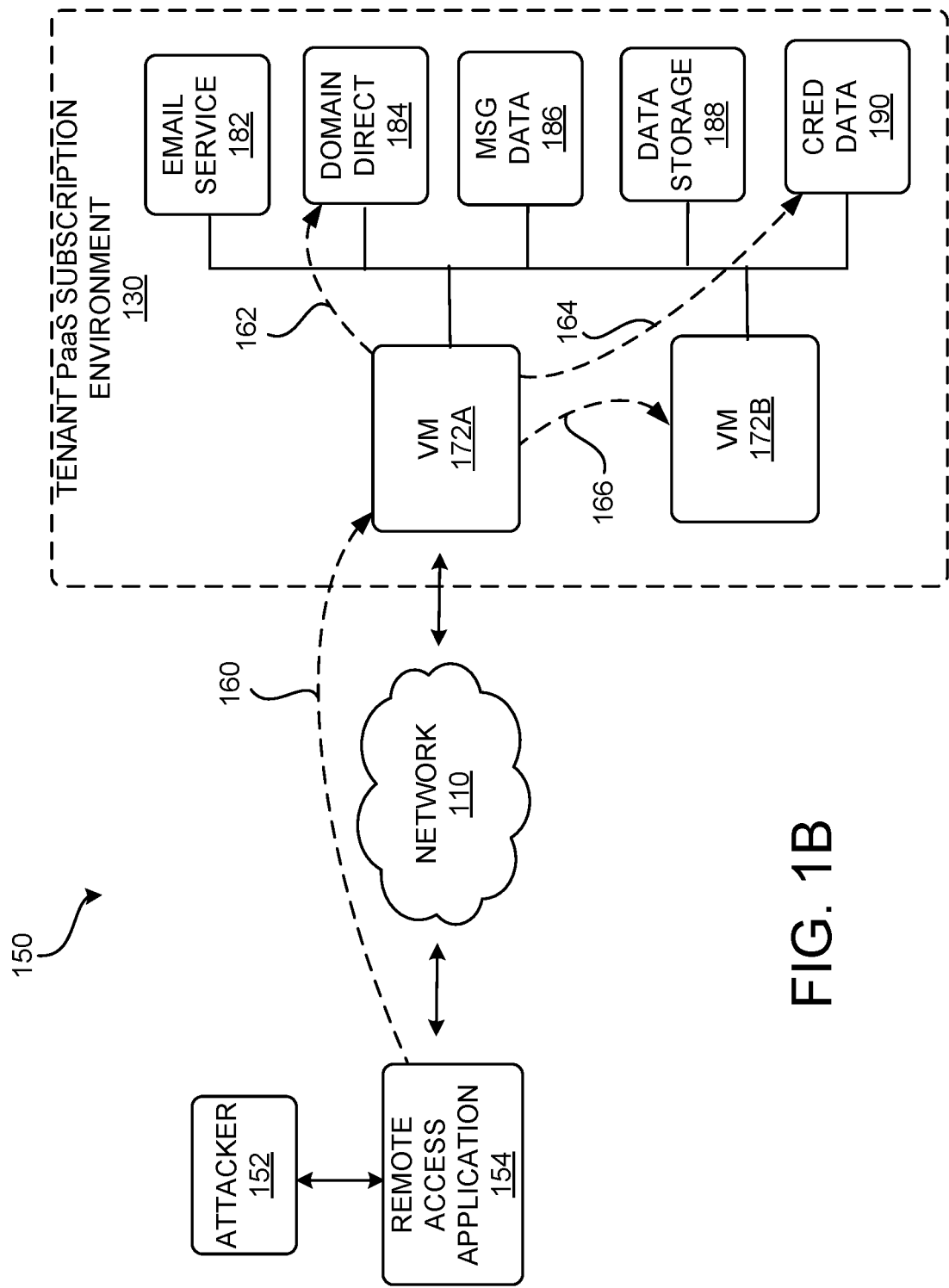
FIG. 1B is a software architecture diagram showing an illustration of an attack by a malicious entity conducted in a remote computing resource system.

FIG. 1B is a software architecture diagram showing an illustration of a lateral attack 150 on a tenant subscriber environment 130 for a remote computing resource system that demonstrates how an attacker may attempt to access a variety of resources of a tenant PaaS subscription environment. In this example, attacker 152 using a remote access application 154 gains access, at 160, to an account in tenant subscriber environment 130 through virtual machine (VM) 172A. The attacker then uses the access obtained using the comprised account to access, at 162, domain directory 184 to identify other resources within the tenant domain for attack. The attacker may use the compromised account to laterally attack, at 166, another VM 172B in tenant environment 130. Or the attacker may, at 164, attempt to access credential data store 190 to obtain credentials for other accounts in the tenant domain, which the attacker will use to access the data and resources for those accounts.

An attacker may also search communications data such as email messages in email service 182 or text or voice messages in message data 186 to obtain, for example, sensitive information, such as compromising communications, or additional user account names to use in additional brute force attacks. The attacker may use the compromised account to access data files and records in data storage 188, such as documents, personal records, or financial transactions.

Figure 2A:
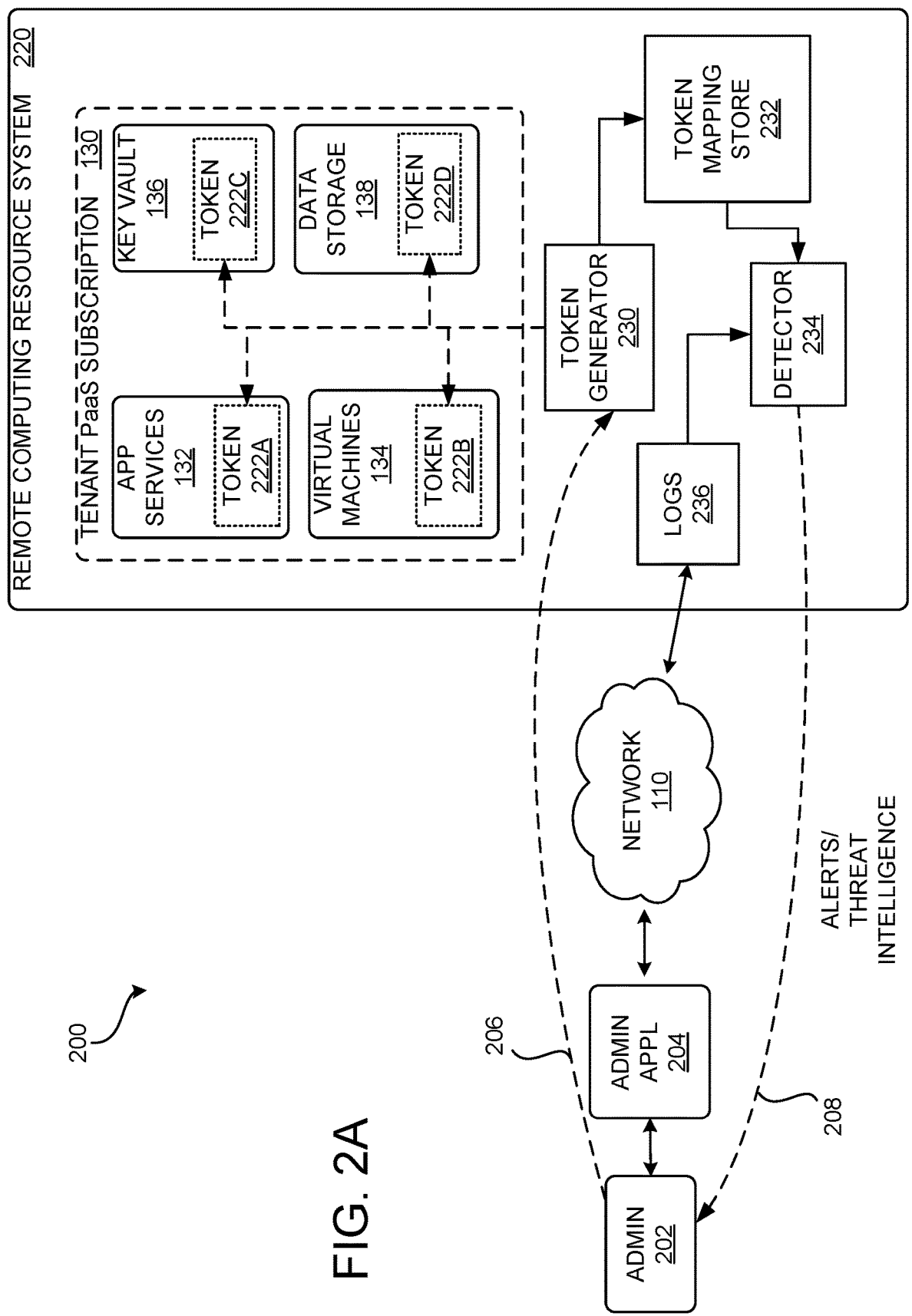
FIG. 2A is a software architecture diagram showing an illustration of a remote computing resource system that that generates and deploys honey tokens in computer resources accordance with the disclosed technology.

FIG. 2A is a software architecture diagram showing an illustration of a remote computing resource system 220 that can perform intrusion detection according to certain aspects of the disclosed technologies. In this example, remote computing resource system 220, like remote computing resource system 120 of FIG. 1A, provisions a tenant PaaS subscription environment 130 for a tenant with resource modules for application services 132, virtual machines 134, a key vault 136 and data storage 138.

In addition, remote computing resource system 220 includes token generator 230, which can generate honey tokens 222 and deploy the tokens 222 in the resource modules of the tenant environment in accordance with the disclosed technology. In this example, an administrative user 202 utilizes a user interface (UI) provided by administrative application 204 that communicates with token generator 230 through network 110 to control the intrusion detection process.

At 206, administrative user 202 enables intrusion detection for tenant environment 130. When intrusion detection is enabled, token generator 230 generates honey tokens that correspond to resources that can be provisioned for the tenant, e.g. unused tenant resources, or resources that are owned by the remote computing resource system, e.g. resources that are reserved for the remote computing resource system.

For each resource module that is identified for intrusion detection, token generator 230 allocates a provisioned resource as a honey token and deploys an access credential or token 222 for accessing the honey token to the resource module. The token generator 230 also creates a data entry in token mapping store 232 that identifies, for each honey token, the tenant, the access credential 222 and the resource module.

For example, token generator 230 allocates a resource with a corresponding access credential for intrusion detection for application services module 132 and deploys the access credential 222A, e.g. a connection string for the resource, in the application services module 132. Token generator 230 also creates a data entry in token mapping store 232 that identifies the tenant, the access credential 222A, and the application service module 132.

Similarly, token generator 230 allocates a resource for virtual machine module 134, deploys the access credential 222B for the resource in virtual machine module 134, and creates a data entry in token mapping store 232 that maps access credential 222B to virtual machine module 134. Likewise, token generator 230 allocates a resource for key vault 136, deploys the access credential 222C, e.g. an access key, in key vault 136, and creates a data entry in token mapping store 232 that maps access credential 222C to key vault 136. Further, token generator 230 allocates a resource for data storage module 138, deploys the access credential 222D, e.g. an access token, in data storage module 138, and creates a data entry in token mapping store 232 that maps access credential 222D to data storage module 138.

Note that in some configuration where a tenant subscriber also utilizes on-premises or in-house resources in addition to the tenant resources provisioned for the tenant on remote computer resource system 220, token generator 230 can be configured to allocate a resource and send the access credential to an administrative user for the user to deploy in an on-premise resource. The data entry in the token mapping store can include an indication that the access credential was deployed in an on-premise resource. Alternatively, the user can send a message identifying the on-premise resource in which the access credential was deployed. Other variations are possible that are in accordance with the disclosed technology.

Subsequent access attempts to the resource modules of tenant PaaS subscription environment 130 are logged in logs 236. Once the honey tokens are generated and deployed, detector 234 for scan the logs 236 to find access attempts that have an access credential that matches an access credential of a data entry in token mapping store 232. If a matching entry is found in token mapping store 232, then the resource module for the matching entry has been compromised. Detector 234 can generate an alert message that is sent to administrator 202 that identifies the compromised resource module so that the administrator can assess the detected intrusion and take further action. Alternatively or in addition, detector 234 can include the detected intrusion data and other IoCs in a threat intelligence feed so that the detected intrusion can be considered in a broader threat assessment and response.

Figure 2B:
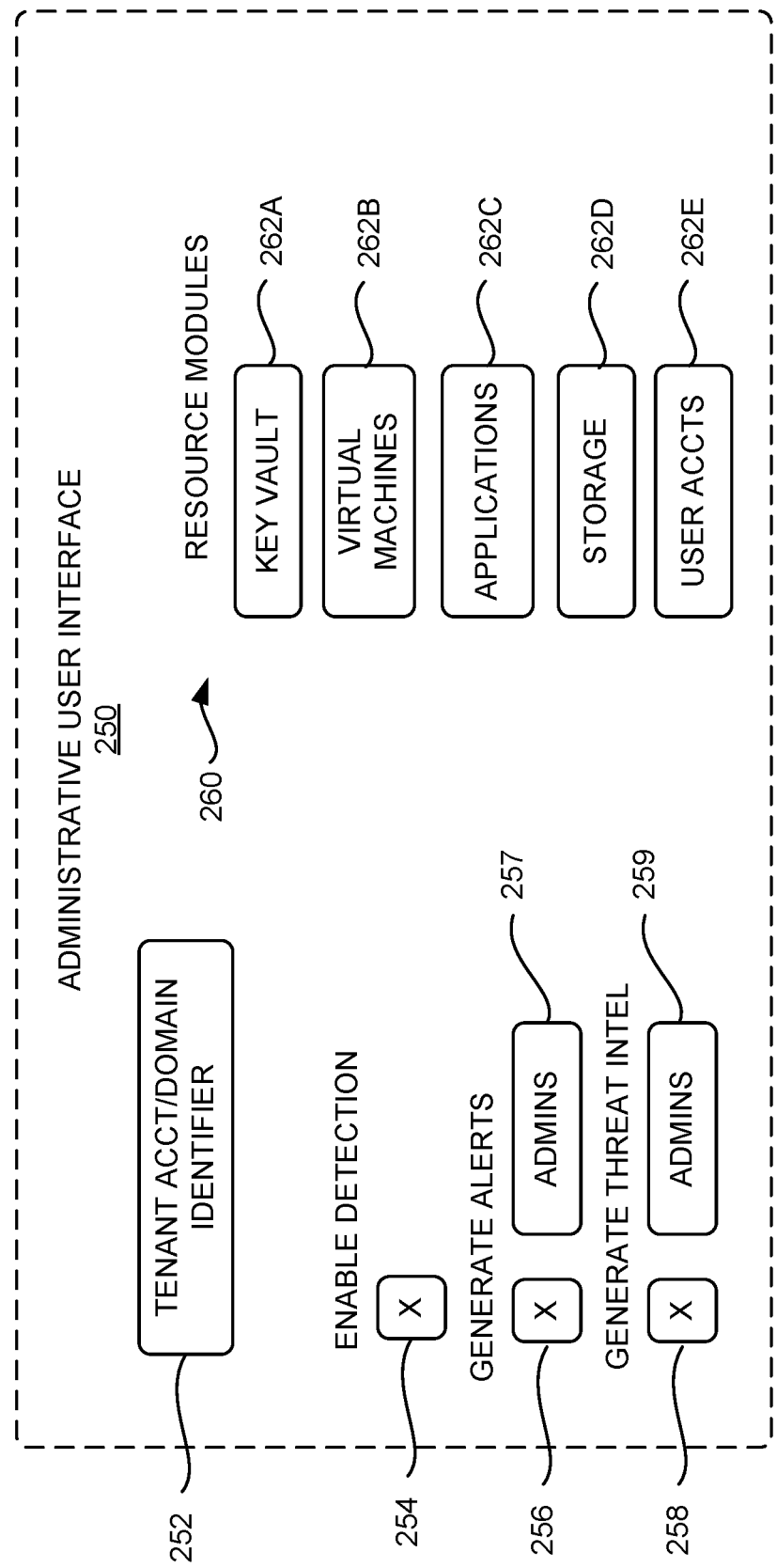
FIG. 2B is a schematic diagram showing an illustrative example of an administrative user interface for enabling intrusion detection and identifying resource modules for deployment of honey tokens in accordance with the disclosed technology.

FIG. 2B is a schematic diagram showing an illustration of an administrator UI 250, such as may be presented to administrator 202 via administrator application 204 in the example of FIG. 2A, that enables an administrator to enable intrusion detection and identify tenant resource modules that are to be monitored. In some implementations, administrator UI 250 can be presented to an administrator for an entity that is a tenant user of a remote computing resource system 220. In other implementations, administrator UI 250 can be presented to an administrator for the remote computing resource system 220. A variety of approaches are compatible with the disclosed technology.

In the example of FIG. 2B, a tenant account or domain identifier 252 identifies the tenant PaaS subscription environment 130 to which the settings defined in UI 250 are applied. Intrusion detection in accordance with certain aspects of the disclosed technology is enabled by checking enable detection input box 254. Enabling intrusion detection will cause honey tokens to be generated and deployed in the resources for the tenant, e.g. token generator 230 of remote computing resource system 220 allocates tokens 222 that are deployed in the resources provisioned for tenant PaaS subscription environment 130.

Checking box 256 enables alerts to be generated in the event that an intrusion is detected and sent to the entities identified in admins field 257. Similarly, checking box 258 enables threat intelligence and IoC data to be generated and sent to the entities identified in admins field 259. In this example, different entities can be designated to receive the alerts notifications or the threat intelligence data. For example, one or more tenant administrators can be designated to receive the alerts so that the tenant administrators can take immediate action while one or more administrators for remote computing resource system 220 or administrators for security services or applications can be designated to receive threat intelligence to analyze the patterns and characteristics of the intrusions detected by remote computing resource system 220.

The resource modules fields 260 can be used to select and identify the resources of the tenant PaaS subscription environment 130 identified in field 252 to be configured with honey tokens for intrusion detection in accordance with the disclosed technology. In the example shown, a key vault is selected using field 262A, a virtual machine is selected using field 262B, an application service is selected using field 262C, a storage resource is selected using field 262D, and user accounts are selected using field 262E. A wide range of tenant resources can be selected and configured for intrusion detection. It will be readily appreciated that a variety of approaches for enabling and selecting intrusion detection can be implemented that are in accordance with the disclosed technology.

Figure 3:
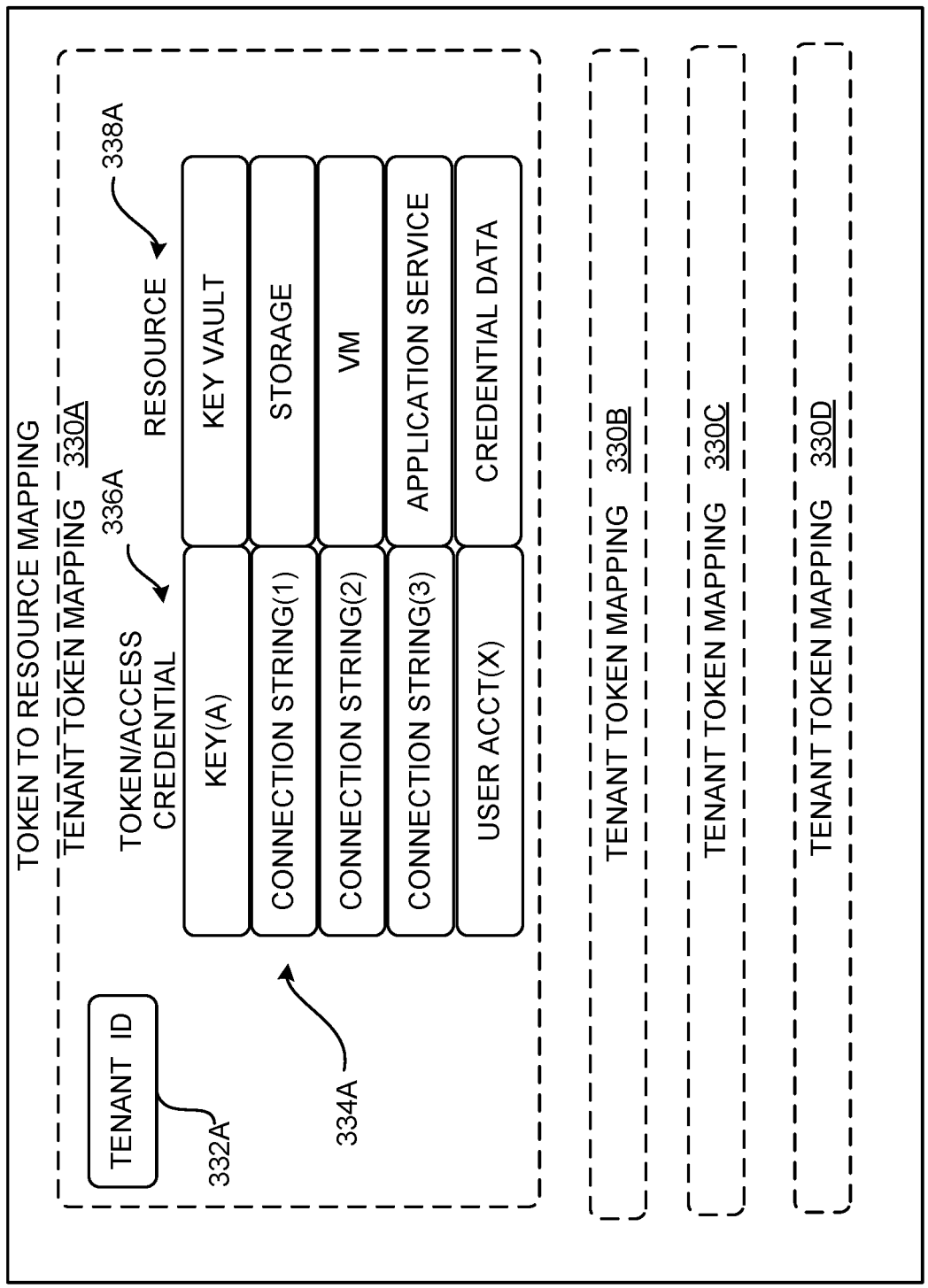
FIG. 3 is data architecture diagram illustrating one example for token to resource mapping data stored in a token mapping store in accordance with the disclosed technology.

FIG. 3 is data architecture diagram illustrating one example for token to resource mapping data stored in token mapping store 232 shown in FIG. 2B. In this example, a tenant to token mapping 330 is stored with the token to resource mapping for the intrusion tokens generated and deployed in the resources of the tenant PaaS subscription environment 130 identified in field 332. In this example, a mapping table 334 is utilized to store the mapping of tokens or access credentials in column 336 to corresponding resources in column 338. A token or access credential maps to the resource identified in the same row as table 334.

In the tenant token mapping 330A illustrated in FIG. 3, KEY(A) was generated and deployed to a key vault. CONNECTION STRING(1) for a resource was generated and deployed to a storage resource. CONNECTION STRING(2) was generated and deployed to a virtual machine. CONNECTION STRING(3) was generated and deployed to an application service. USER ACCT(X) was generated and deployed in a credential data store.

Because the token or access credentials in mapping table 334 relate to an unused tenant resource or a resource in remote computing resource system 220, an access attempt that utilized the toke or access credentials indicates that security for the corresponding resource is compromised. FIG. 4 is a message diagram illustrating an example of an exchange of messages 400 when an intrusion is detected. At 402, an attacker 104 submits an access request to remote service provider system 220 with a connection string that relates to a honey token that was generated and deployed in a resource. It is assumed that the attacker must have gained access to the resource in order to obtain the connection string for the honey token. The access attempt is logged in an access log.

At 404, the connection string in the attacker's access request is resolved to the honey token resource, e.g. an unused tenant resource or a remote service provider system resource. If the connection string pertained to a fictitious resource, the connection string cannot be resolved to a resource and an error message is returned to the attacker, which can alert the attacker to their intrusion has been detected. Because the honey token is a provisioned resource, the connection string will successfully resolve to the honey token resource, at 404, and a success message is returned, at 406. The success message is relayed, at 408, to the attacker 104.

Subsequently, token detection 250 in FIG. 2B will scan the access log for token or access credentials that are defined in token mapping store 232. When a mapping that matches the connection string is found, an alert that includes the resource to which the connection string is mapped is generated and sent, at 412, to an administrator to warn that the resource has been compromised.

In addition, in this example, threat intelligence data is generated and provided to an administrator or security service, at 414. For example, threat intelligence data indicating the attacker and the resource can be provided that, when combined with other threat intelligence data, provides useful information to a security service to identify the attacker, the attacker's methods and other data that can be used for developing counter measures to the attacker or warn other systems about the attacker.

Figure 5A:
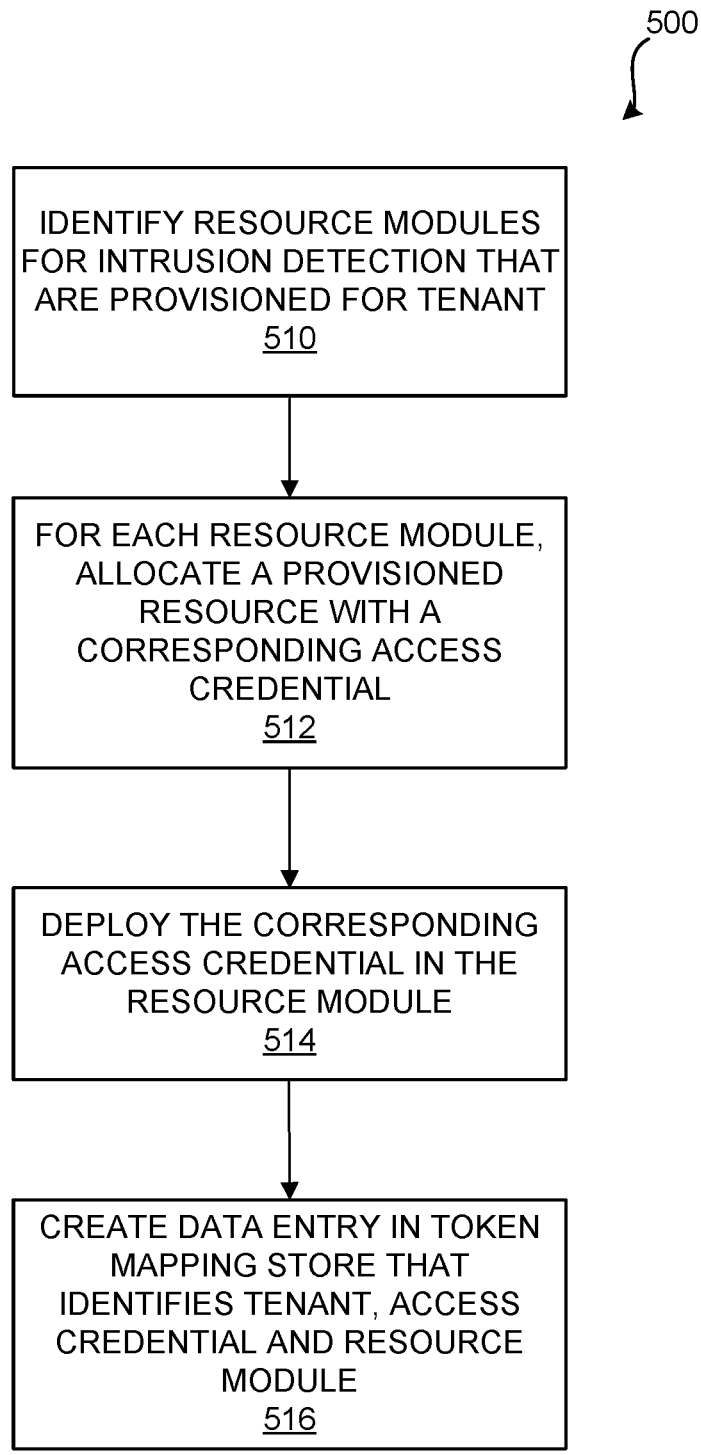
FIG. 5A is a flow diagram showing an illustrative example of a process for creating and deploying honey tokens in accordance with the disclosed technology.

FIG. 5A is a control flow diagram that illustrates an example of a process 500 for creating and deploying honey tokens. At 510, the resource modules for a tenant environment are identified for intrusion detection, such as by using the administrative UI 250 of FIG. 2B. At 512, for each resource module identified for intrusion detection, a provisioned resource is allocated along with a corresponding access credential. As noted above, the provisioned resource can be an unused tenant resource or a resource reserved for the host remote computing resource system.

Often, an access credential is created when the resource is allocated. For example, in an AZURE system, when a storage account is allocated, the system generates a key, which is the access credential for accessing the storage account. Similarly, connection strings can be produced when a resource is allocated. Generally, the access credential provides access to the allocated resource such that, when the attacker is directed to the resource endpoint when they utilize the access credential.

There are many access credentials that may be suitable for use with the disclosed technology. In addition to the examples described above, other examples include subscription management certificates, publishing settings, SAS tokens, service bus connection strings, AZURE Active Directory service principal keys, Biztalk Hybrid connection strings, Redis access keys, access control service keys, API management keys, document database keys, and AZURE batch access keys. It will be readily appreciated that many types of provisioned resources along with their corresponding access credentials that can be used as honey tokens in accordance with certain aspects of the disclosed technology.

At 514, the access credential is deployed to the resource module. For example, the key for the storage account can be deployed in a key vault resource. In another example, a connection string to a storage resource can be deployed in an application service or a virtual machine.

At 516, a data entry is created in a token mapping store that maps the access credential to the resource in which it was deployed. As illustrated in the example of FIG. 3, the access credential in mapped to the resource in which the access credential was deployed.

The steps 512, 514 and 516 can be repeated for each resource module selected for intrusion detection. A honey token is generated by allocating a provisioned resource and the access credential that is created for the resource is deployed in the tenant resource module selected for intrusion detection. The token mapping store maps each access credential to the resource module in which it was deployed. If the resource module is compromised by an attacker, then the attacker can obtain the access credential deployed in the resource module and, when the attacker uses the access credential to access the corresponding provisioned resource, the access credential is recognized and mapping in the token mapping store will identify the compromised resource module.

Figure 5B:
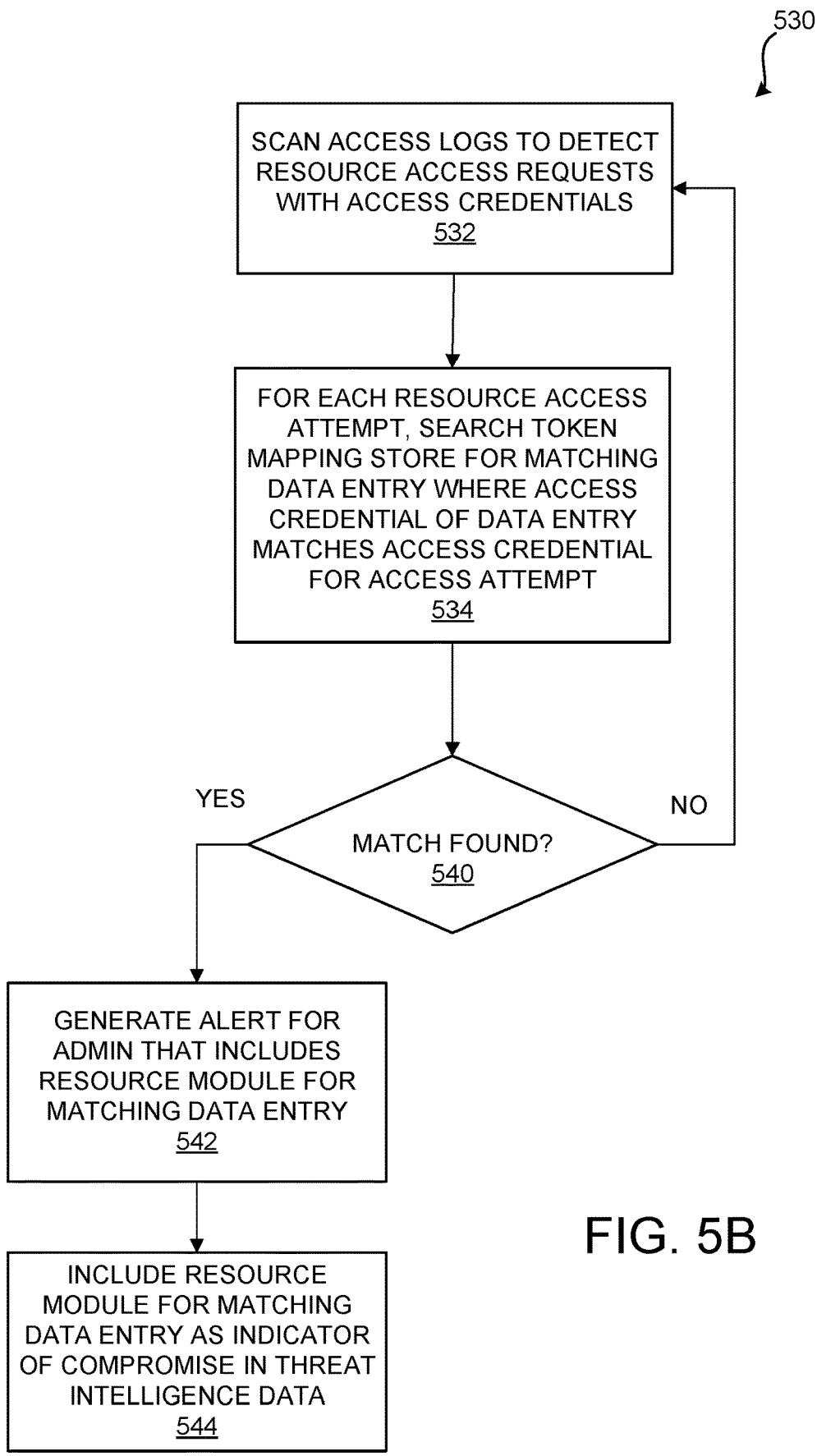
FIG. 5B is a flow diagram showing an illustrative example of an intrusion detection process in accordance with the disclosed technology.

FIG. 5B is a control flow diagram that illustrates an example of an intrusion detection process 530 in accordance with certain aspects of the disclosed technology. As noted above with respect to FIG. 4, access requests to tenant subscriber resources are logged in access logs.

At 532, the access logs are scanned to detect resource access requests with access credentials. At 534, for each resource access attempt is checked against the token mapping store to determine if the access credential in the resource access attempt matches a data entry in the token mapping store.

If a match is found, then control branches at 540 to 542, where an alert is generates for an administrator that includes the resource module from the matching data entry in the token mapping store. For example, if field 256 of UI 250 in FIG. 2B is selected, then an alert message can be sent to one or more administrators identified in field 257, where the alert message identifies the resource module from the matching data entry.

Similarly, if field 2568 of UI 250 in FIG. 2B is selected, then threat intelligence data can be sent to one or more administrators identified in field 259, where the threat intelligence data identifies the resource module from the matching data entry. The threat intelligence data can include other information, such as information from the attacker's access request.

One of skill in the art will readily appreciate that a variety of approaches may be utilized for honey token generation and deployment for intrusion detection without departing from the scope of the disclosed technology. The approach of the disclosed technology provides for the automatic generation of honey tokens that correspond to provisioned resources in a tenant subscriber environment or a host remote computing services system. Because the honey tokens are mapped to the resource module in which they have been deployed, a compromised resource module can be readily identified, which can the security and control of tenant subscriber resources and data. Also, the data collected for a detected intrusion can be included in a threat intelligence feed in order to share the information with security entities, which can also improve the security of computer systems.

It is to be appreciated that while the embodiments disclosed herein have been presented primarily in the context of a remote computing resources system. The technologies disclosed herein can be similarly applied to other contexts where similar functionality is utilized to provide computing resources that may be subject to compromise.

Figure 6:
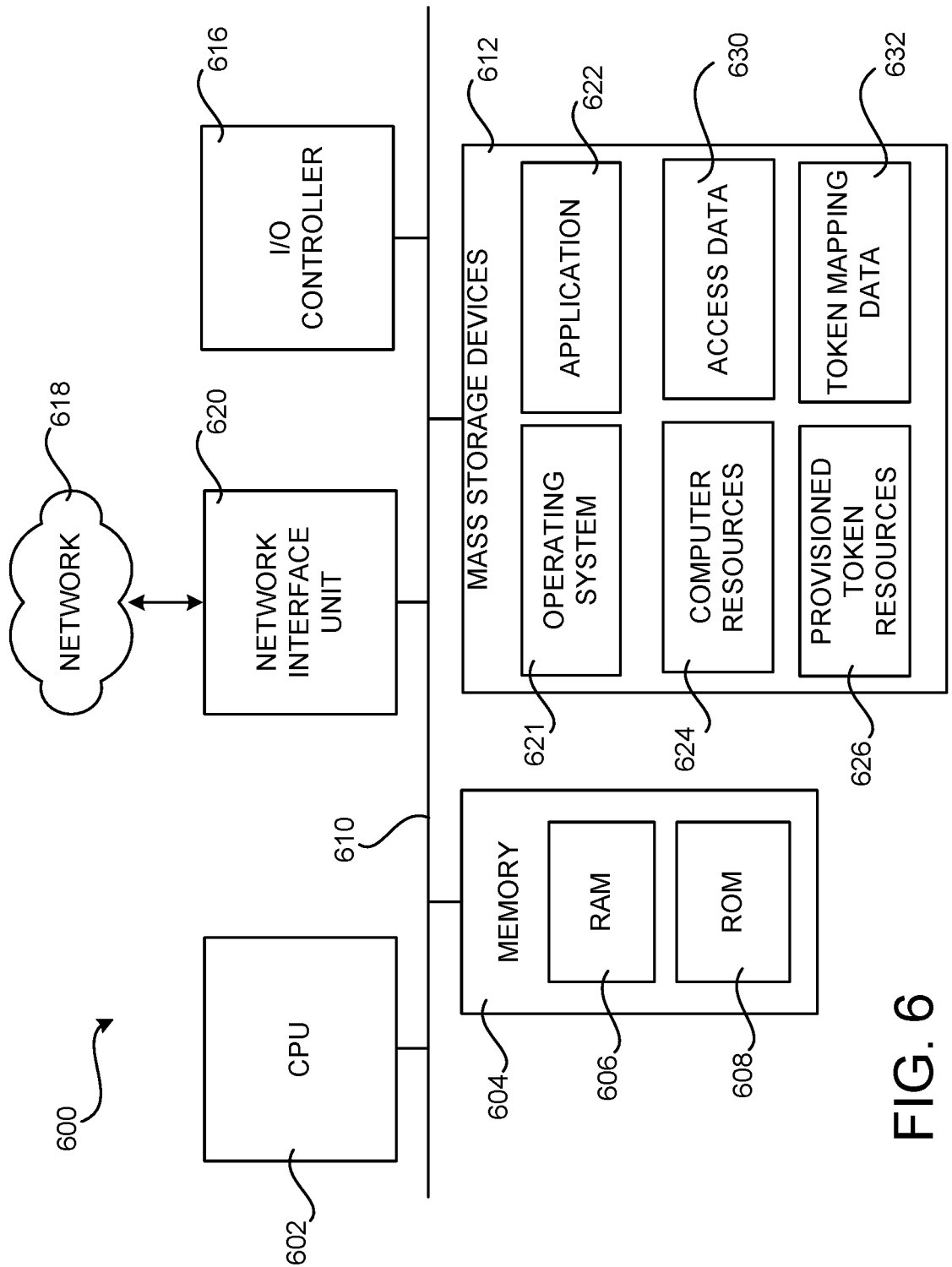
FIG. 6 is a computer architecture diagram showing an illustrative computer hardware and software architecture for a computing device, such as the computing devices shown in FIG. 2A that can implement aspects of the technologies presented herein.

FIG. 6 is a computer architecture diagram that shows an architecture for a computer 600 capable of executing the software components described herein. The architecture illustrated in FIG. 6 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to FIG. 6 can be utilized to implement the remote computer resources system 220 illustrated in FIG. 2A, which is capable of executing the various software components described above, such as the operations of the processes illustrated in FIGS. 5A-B.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, is stored in the ROM 608. The computer 600 further includes one or more mass storage devices 612 for storing an operating system 621, application programs 622, and other types of programs and data including, but not limited to, the computer resources 624, provisioned token resource 626, access data 630 and token mapping data 632. The computer resources 624, access data 630 and event monitoring code can be stored in a different storage device from one another.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
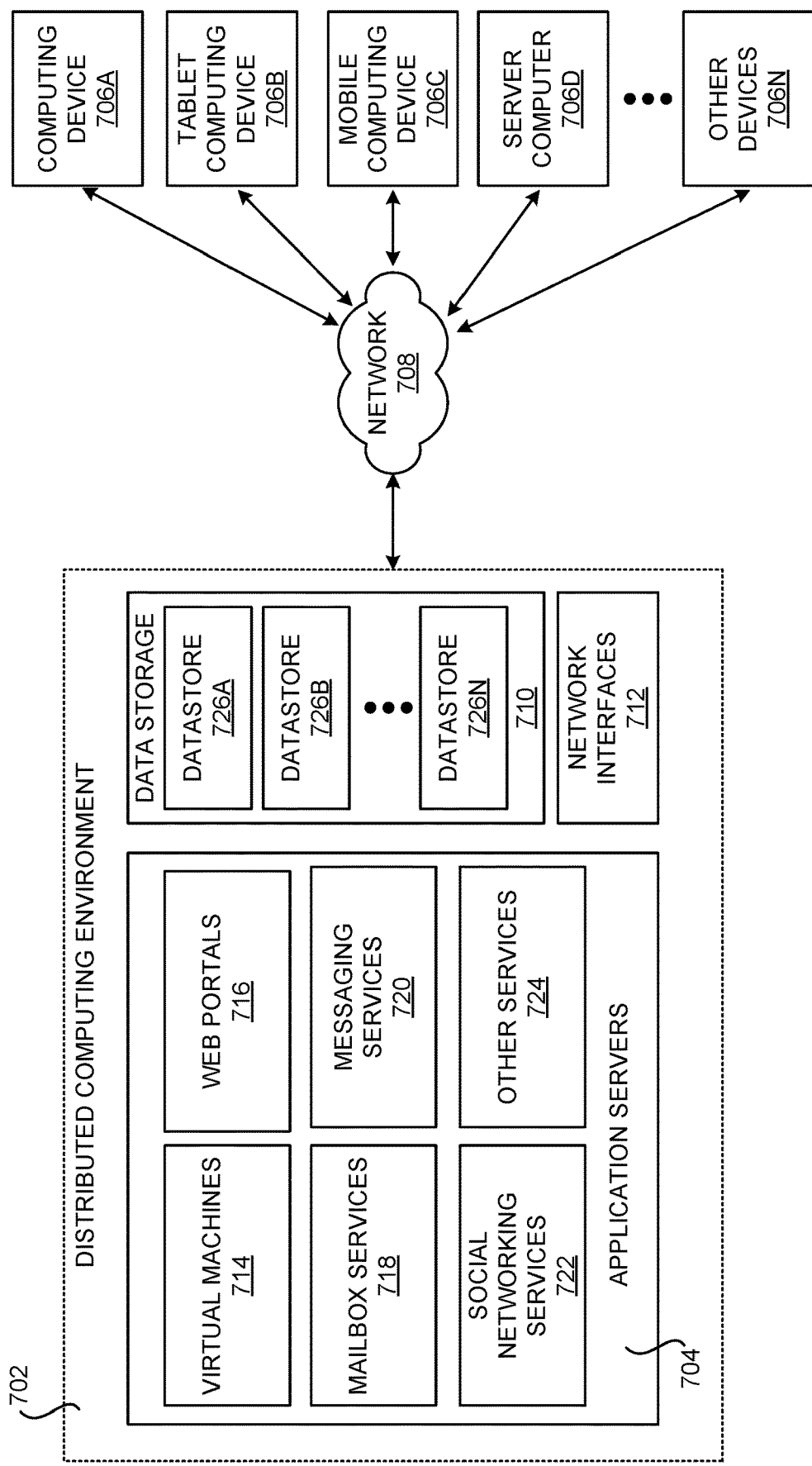
FIG. 7 is a network diagram illustrating a distributed computing environment capable of implementing aspects of the technologies presented herein.

FIG. 7 shows aspects of an illustrative distributed computing environment 702 that can provide cloud sourced resources, in which the software components described herein can be executed. Thus, the distributed computing environment 702 illustrated in FIG. 7 can be used to execute program code capable of providing the functionality described above with respect to FIGS. 1-5 and/or any of the other software components described herein.

According to various implementations, the distributed computing environment 702 operates on, in communication with, or as part of a network 708. One or more client devices 706A-706N (hereinafter referred to collectively and/or generically as "devices 706") can communicate with the distributed computing environment 702 via the network 708 and/or other connections (not illustrated in FIG. 7).

In the illustrated configuration, the devices 706 include: a computing device 706A such as a laptop computer, a desktop computer, or other computing device; a "slate" or tablet computing device ("tablet computing device") 706B; a mobile computing device 706C such as a mobile telephone, a smartphone, or other mobile computing device; a server computer 706D; and/or other devices 706N. It should be understood that any number of devices 706 can communicate with the distributed computing environment 702. Two example computing architectures for the devices 706 are illustrated and described herein with reference to FIGS. 6 and 8. It should be understood that the illustrated client devices 706 and computing architectures illustrated and described herein are illustrative and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 708. The application servers 704 can host various services such as virtual machines, portals, and/or other resources. In the illustrated configuration, the application servers 704 host one or more virtual machines 714 for hosting applications, such as program components for implementing the functionality described above with regard to FIGS. 1-5. It should be understood that this configuration is illustrative and should not be construed as being limiting in any way. The application servers 704 might also host or provide access to one or more web portals, link pages, websites, and/or other information ("web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the FOURSQUARE geographic networking service, and the like. In other configurations, the social networking services 722 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 722 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. These services can include, but are not limited to, streaming video services like the NETFLIX streaming video service and productivity services such as the GMAIL email service from GOOGLE INC. It thus can be appreciated that activities performed by users of the distributed computing environment 702 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 702 can include data storage 710. According to various implementations, the functionality of the data storage 710 is provided by one or more databases operating on, or in communication with, the network 708. The functionality of the data storage 710 can also be provided by one or more server computers configured to host data for the distributed computing environment 702. The data storage 710 can include, host, or provide one or more real or virtual datastores 726A-726N (hereinafter referred to collectively and/or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the devices 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. It should also be understood that the devices 706 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 702 to utilize the functionality described herein.

Figure 8:
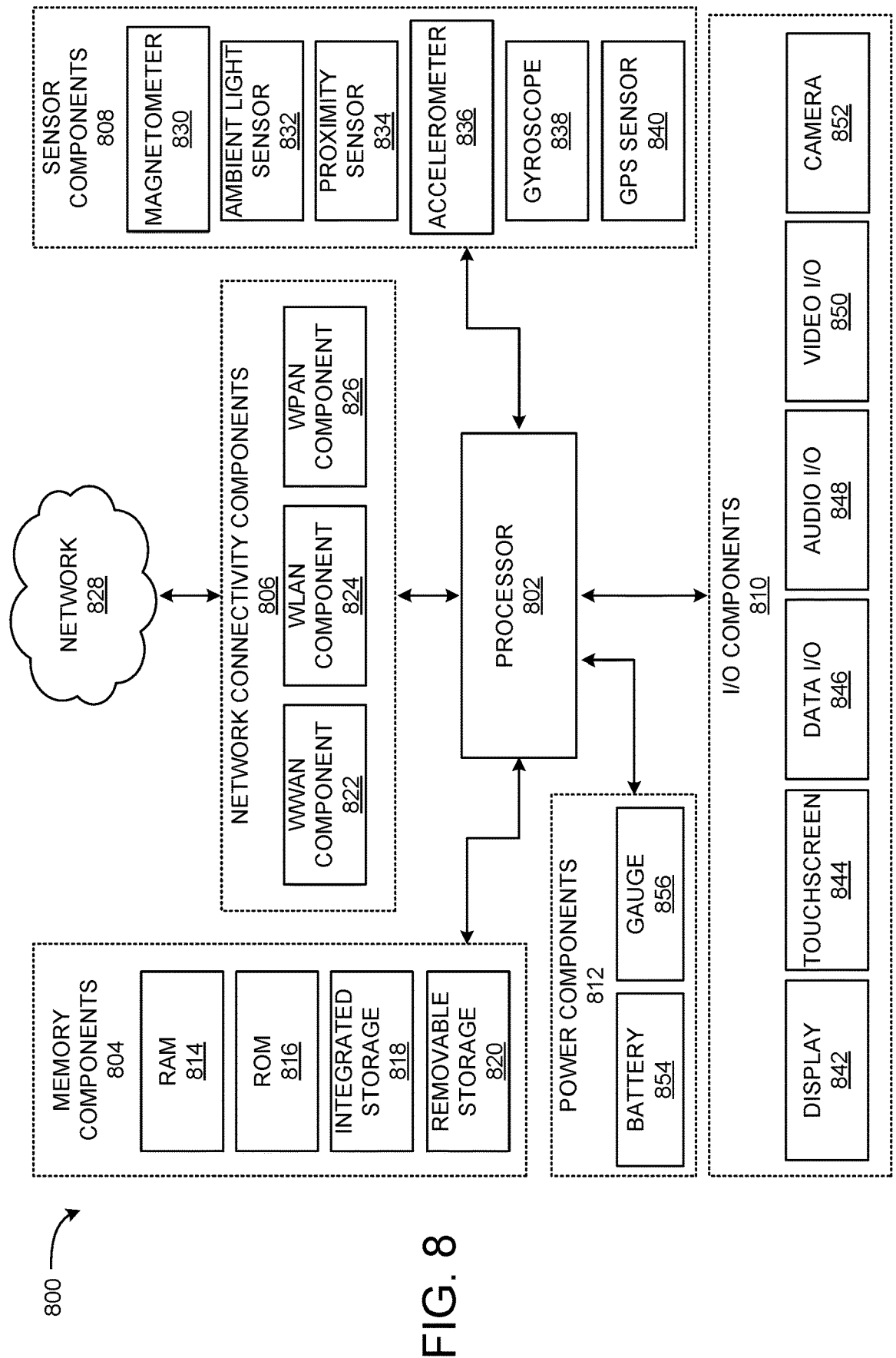
FIG. 8 is a computer architecture diagram illustrating a computing device architecture for a computing device, such as the computing devices shown in FIG. 2A, that is capable of implementing aspects of the technologies presented herein.

Turning now to FIG. 8, an illustrative computing device architecture 800 will be described for a computing device, such as the computing devices 104 and remote computing resource provider system 220 illustrated in FIGS. 1-2, that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the devices 706 shown in FIG. 7. Furthermore, aspects of the computing device architecture 800 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse. The computing device architecture 800 can also be utilized to implement the remote computer resources system of FIG. 2A and/or other types of computing devices for implementing or consuming the functionality described herein.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more CPU cores configured to process data, execute computer executable instructions of one or more application programs and to communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, California and others. In some configurations, the processor 802 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated in the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS operating system from MICROSOFT CORPORATION, the IOS operating system from APPLE INC. of Cupertino, California, and ANDROID operating system from GOOGLE INC. of Mountain View, California Other operating systems can also be utilized.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations, the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance user input operations. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 can include discrete processors configured to support the various interfaces described below or might include processing functionality built-in to the processor 802.

The display 842 is an output device configured to present information in a visual form. In particular, the display 842 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component 810. Other configurations can also be utilized.

The disclosure presented herein also encompasses the subject matter set forth in the following clauses:

Clause 1. A computer-implemented method for intrusion detection in a remote computing resource system, the method comprising: identifying one or more tenant resource modules for intrusion detection, where the tenant resource modules are provisioned for a tenant of a remote service provider system; for each of the one or more identified resource modules: allocating a storage account having a corresponding access credential, deploying the corresponding access credential in the identified resource module, and creating a data entry in a token mapping store, where the data entry identifies the tenant, the access credential, and the identified resource module.

Clause 2. The computer-implemented method of Clause 1, where the method includes: scanning one or more access logs for the remote computing resource system to detect one or more resource access attempts, each access attempt including an access credential for the access attempt; for each resource access attempt: searching the token mapping store for a matching data entry where the access credential of the data entry matches the access credential for the access attempt, and if the matching data entry is found, generating an alert that includes the identified resource module of the matching data entry.

Clause 3. The computer-implemented method of Clause 1, where the provisioned resource comprises one of an unused resource allocated for the tenant.

Clause 4. The computer-implemented method of Clause 3, where the unused resource allocated for the tenant comprises a container with restricted access permissions.

Clause 5. The computer-implemented method of Clause 1, where the provisioned resource comprises a resource provisioned in the remote computing resource system.

Clause 6. The computer-implemented method of Clause 1, where the one or more tenant resource modules provisioned for a tenant of a remote service provider system comprises one or more of a key vault, a data store, a virtual machine, an application service, an application programming interface, a communications store, a domain directory, and a credential data store.

Clause 7. An intrusion detection system for detecting intrusion in a remote computing resource system, the system comprising: one or more processors; and one or more memory devices in communication with the one or more processors, the memory devices having computer-readable instructions stored thereupon that, when executed by the processors, cause the processors to perform a method comprising: identifying one or more resource modules for intrusion detection, where the resource modules are provisioned for a tenant of a remote service provider system; for each of the one or more identified resource modules: allocating a provisioned resource having a corresponding access credential, deploying the corresponding access credential in the identified resource module, and creating a data entry in a token mapping store, where the data entry identifies the tenant, the access credential, and the identified resource module.

Clause 8. The system of Clause 7, where the method includes: scanning one or more access logs for the remote computing resource system to detect one or more resource access attempts, each access attempt including an access credential for the access attempt; for each resource access attempt: searching the token mapping store for a matching data entry where the access credential of the data entry matches the access credential for the access attempt, and if the matching data entry is found, generating an alert that includes the identified resource module of the matching data entry.

Clause 9. The system of Clause 7, where: the step of allocating a provisioned resource comprises generating a storage account; and the corresponding access credential comprises a key to the storage account.

Clause 10. The system of Clause 7, where the provisioned resource comprises an unused resource allocated for the tenant and a resource provisioned in the remote computing resource system.

Clause 11. The system of Clause 10, where the unused resource allocated for the tenant comprises one of a container with restricted access permissions and a fictitious user account in a domain corresponding to the tenant.

Clause 12. The system of Clause 7, where the corresponding access credential for the provisioned resource comprises one of a connection string, an access key, a certificate, a service key, a management key, a storage key, or an access token.

Clause 13. The system of Clause 7, where the one or more resource modules provisioned for a tenant of a remote service provider system comprises one or more of a key vault, a data store, a virtual machine, an application service, an application programming interface, a communications store, a domain directory, and a credential data store.

Clause 14. One or more computer storage media having computer executable instructions stored thereon which, when executed by one or more processors, cause the processors to execute a method for creating and deploying honey tokens for intrusion detection in a remote computing resource system, the method comprising: identifying one or more resource modules for intrusion detection, where the resource modules are provisioned for a tenant of a remote service provider system; for each of the one or more identified resource modules: allocating a provisioned resource having a corresponding access credential, deploying the corresponding access credential in the identified resource module, and creating a data entry in a token mapping store, where the data entry identifies the tenant, the access credential, and the identified resource module.

Clause 15. The one or more computer storage media of Clause 14, where the method includes: scanning one or more access logs for the remote computing resource system to detect one or more resource access attempts, each access attempt including an access credential for the access attempt; for each resource access attempt: searching the token mapping store for a matching data entry where the access credential of the data entry matches the access credential for the access attempt, and if the matching data entry is found, generating (542) an alert that includes the identified resource module of the matching data entry.

Clause 16. The one or more computer storage media of Clause 15, where: the step of allocating a provisioned resource comprises generating a storage account; and the corresponding access credential comprises a key to the storage account.

Clause 17. The one or more computer storage media of Clause 14, where the provisioned resource comprises an unused resource allocated for the tenant and a resource provisioned in the remote computing resource system.

Clause 18. The one or more computer storage media of Clause 17, where the unused resource allocated for the tenant comprises one of a container with restricted access permissions, a fictitious user account in a domain corresponding to the tenant.

Clause 19. The one or more computer storage media of Clause 14, where the corresponding access credential for the provisioned resource comprises one of a connection string, an access key, a certificate, a service key, a management key, a storage key, or an access token.

Clause 20. The one or more computer storage media of Clause 14, where the one or more resource modules provisioned for a tenant of a remote service provider system comprises one or more of a key vault, a data store, a virtual machine, an application service, an application programming interface, a communications store, a domain directory, and a credential data store.

Based on the foregoing, it should be appreciated that the disclosed technology enables improved generation, deployment and management of honey tokens for intrusion detection in computer resources, which improves security by detecting when a computer resource module has been compromised.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for intrusion detection in a remote computing resource system, the method comprising:
providing a user interface (UI) by way of the remote computing resource system, the UI identifying a plurality of tenant resource modules provisioned in the remote computing resource system for a tenant of the remote computing resource system to provide resources for the tenant, wherein the tenant resource modules provisioned for the tenant of the remote computing resource system comprise one or more of a key vault, a virtual machine, an application service, an application programming interface, or a domain directory;
receiving a selection by way of the UI of one or more of the plurality of tenant resource modules to be configured for intrusion detection;
responsive to receiving the selection by way of the UI, for the tenant resource modules selected in the UI,
allocating provisioned resources having corresponding access credentials,
deploying the corresponding access credentials in respective tenant resource modules, and
creating one or more data entries in a token mapping store, the data entries providing a mapping between the tenant, the corresponding access credentials and the identified tenant resource modules in which the corresponding access credentials were deployed;
scanning one or more access logs for the remote computing resource system to detect one or more resource access attempts, each access attempt including an access credential for the access attempt; and
for each resource access attempt,
searching the token mapping store for a matching data entry where the access credential of the data entry matches the access credential for the access attempt, and
if the matching data entry is found, generating an alert that identifies the identified resource module of the matching data entry.

2. The computer-implemented method of claim 1, wherein the provisioned resources comprise at least one of an unused resource allocated for the tenant.

3. The computer-implemented method of claim 1, wherein the unused resource allocated for the tenant comprises a container with restricted access permissions.

4. The computer-implemented method of claim 1, wherein the UI further comprises a UI control which, when selected, will cause threat intelligence data to be generated and sent to one or more entities.

5. The computer-implemented method of claim 1, wherein the UI further comprises selectable fields identifying the plurality of tenant resource modules provisioned in the remote computing resource system for the tenant of the remote computing resource system.

6. An intrusion detection system for detecting intrusion in a remote computing resource system, the system comprising:
one or more processors; and
one or more memory devices in communication with the one or more processors, the memory devices having computer-readable instructions stored thereupon that, when executed by the processors, cause the processors to perform operations comprising:
providing a user interface (UI) by way of the remote computing resource system, the UI identifying a plurality of tenant resource modules provisioned in the remote computing resource system for a tenant of the remote computing resource system to provide resources for the tenant, wherein the tenant resource modules provisioned for the tenant of the remote computing resource system comprise one or more of a key vault, a virtual machine, an application service, an application programming interface, or a domain directory;
receiving a selection by way of the UI of one or more of the plurality of resource modules to be configured for intrusion detection;
responsive to receiving the selection by way of the UI, for the tenant resource modules selected in the UI,
allocating provisioned resources having corresponding access credentials,
deploying the corresponding access credentials in respective tenant resource modules, and
creating one or more data entries in a token mapping store, the data entries providing a mapping between the tenant, the corresponding access credentials, and the identified tenant resource modules in which the corresponding access credentials were deployed;
scanning one or more access logs for the remote computing resource system to detect one or more resource access attempts, each access attempt including an access credential for the access attempt; and
for each resource access attempt:
searching the token mapping store for a matching data entry where the access credential of the data entry matches the access credential for the access attempt, and if the matching data entry is found, generating an alert that identifies the identified resource module of the matching data entry.

7. The system of claim 6, wherein allocating at least one of the provisioned resources comprises generating a storage account and the corresponding access credential comprises a key to the storage account.

8. The system of claim 6, wherein at least one of the provisioned resources comprises an unused resource allocated for the tenant.

9. The system of claim 8, wherein the unused resource allocated for the tenant comprises one of a container with restricted access permissions and a fictitious user account in a domain corresponding to the tenant.

10. The system of claim 6, wherein at least one of the corresponding access credentials for the provisioned resources comprises one of a connection string, an access key, a certificate, a service key, a management key, a storage key, or an access token.

11. The system of claim 6, wherein the UI further comprises a UI control which, when selected, will cause threat intelligence data to be generated and sent to one or more entities.

12. One or more computer storage media having computer executable instructions stored thereon which, when executed by one or more processors, cause the processors to perform operations for creating and deploying honey tokens for intrusion detection in a remote computing resource system, the operations comprising:
   providing a user interface (UI) by way of the remote computing resource system, the UI identifying a plurality of tenant resource modules provisioned in the remote computing resource system for a tenant of the remote computing resource system to provide resources for the tenant, wherein the tenant resource modules provisioned for the tenant of the remote computing resource system comprise one or more of a key vault, a virtual machine, an application service, an application programming interface, or a domain directory;
   receiving a selection by way of the UI of one or more of the plurality of resource modules to be configured for intrusion detection;
   responsive to receiving the selection by way of the UI, for the one or more tenant resource modules selected in the UI,
      allocating provisioned resources having corresponding access credentials,
      deploying the corresponding access credentials in respective tenant resource modules, and
      creating one or more data entries in a token mapping store, the data entries providing a mapping between the tenant, the corresponding access credentials, and the identified resource modules in which the corresponding access credentials were deployed;
   scanning one or more access logs for the remote computing resource system to detect one or more resource access attempts, each access attempt including an access credential for the access attempt; and
   for each resource access attempt,
      searching the token mapping store for a matching data entry where the access credential of the data entry matches the access credential for the access attempt, and
      if the matching data entry is found, generating an alert that identifies the identified resource module of the matching data entry.

13. The one or more computer storage media of claim 12, wherein allocating at least one of the provisioned resources comprises generating a storage account and the corresponding access credential comprises a key to the storage account.

14. The one or more computer storage media of claim 12, wherein at least one of the provisioned resources comprises an unused resource allocated for the tenant.

15. The one or more computer storage media of claim 14, wherein the unused resource allocated for the tenant comprises one of a container with restricted access permissions or a fictitious user account in a domain corresponding to the tenant.

16. The one or more computer storage media of claim 12, wherein at least one of the corresponding access credentials for the provisioned resources comprises one of a connection string, an access key, a certificate, a service key, a management key, a storage key, or an access token.

17. The one or more computer storage media of claim 12, wherein the UI further comprises a UI control which, when selected, will cause threat intelligence data to be generated and sent to one or more entities.

* * * * *